United States Patent

Salaka et al.

(10) Patent No.: US 11,269,898 B1
(45) Date of Patent: Mar. 8, 2022

(54) MACHINE LEARNING BASED DATABASE QUERY RETRIEVAL

(71) Applicant: A9.com, Inc., Palo Alto, CA (US)

(72) Inventors: Vamsi Salaka, Fremont, CA (US); Parth Gupta, Palo Alto, CA (US); Tommaso Dreossi, Redwood City, CA (US); Jan Bakus, Sunnyvale, CA (US); Yu-Hsiang Lin, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 138 days.

(21) Appl. No.: 16/714,434

(22) Filed: Dec. 13, 2019

(51) Int. Cl.
*G06F 16/2457* (2019.01)
*G06F 16/2453* (2019.01)
*G06N 20/00* (2019.01)

(52) U.S. Cl.
CPC .. *G06F 16/24578* (2019.01); *G06F 16/24535* (2019.01); *G06N 20/00* (2019.01)

(58) Field of Classification Search
CPC .................. G06F 16/24578; G06Q 30/02
See application file for complete search history.

(56) References Cited

U.S. PATENT DOCUMENTS

2017/0286979 A1* 10/2017 Chavez .................. G06Q 20/04

* cited by examiner

*Primary Examiner* — Hau H Hoang
(74) *Attorney, Agent, or Firm* — Knobbe, Martens, Olson & Bear, LLP (57) ABSTRACT

System and methods are provided that can address cold-start problems in database keyword searches. The search system generates machine-learned values for new items based on historical signals for already existing items. These initial values are generated at the time of new item's inclusion in the search index. The values are used as input in a ranking model to rank search results for a user query. The initial values for the new items predict user engagement with the new items based on historical data for existing items and increase the visibility of new items to accumulate user interaction data for the new items.

20 Claims, 6 Drawing Sheets

MACHINE LEARNING BASED DATABASE QUERY RETRIEVAL

BACKGROUND

In a database context, ranking is often a central part of information retrieval. Machine learning techniques can be used to create ranking models for search systems. Such techniques are often referred to as learning to rank or machine-learned ranking. Learning-to-rank based ranking models can rely on several features to rank query results. The features can be based on users' interactions with items, which can be referred to as behavioral features. The training data can include items, queries, query results, and historical data, such as previous users' interactions that can indicate user engagement with the results of a query. The training data can be used by a machine learning algorithm to produce a ranking model that computes the relevance of query results. A user can enter a search query. The ranking model can be applied to some items to determine the ranking of items. Results can be presented based on the ranking.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

As described above, existing search systems can use learning-to-rank based ranking models. The existing systems can use training data in a machine learning algorithm to produce a ranking model that computes the relevance of query results. The learning-to-rank features can be based on users' interactions with items. However, there is a bias against new items due to a reliance on historical signals in these ranking systems. In particular, the ranking models can be trained for user engagement, which can favor behavioral features. This approach to information retrieval can lead to the following dilemma or cycle: a lack of behavioral data for new items can result in a low ranking for the new items, which can result in the new items accruing less behavioral data over time relative to higher ranked items that can cause the new items to remain unduly low in the rankings for some time. This dilemma can be referred to as the cold-start problem.

Generally described, aspects of the present disclosure are directed to improved search systems and methods that can address cold-start problems. The search system can generate machine-learned values for new items based on historical signals for already existing items. These initial values (also referred to herein as prior prediction values) can be generated at the time of the new item's inclusion in the search index. The values can be used as input in a ranking model to rank search results for a user query. The initial values for new items can have several advantages, such as predicting user engagement with new items based on historical data for existing items and potentially increasing the visibility of new items to accumulate user interaction data for the new items.

Some existing search systems can use machine learning algorithms for search such as machine-learned ranking. The existing systems process items and metadata associated with the items. The system can process new items as they are added to the system. Posterior prediction values can be determined for each item from historical user interaction data for the items. The posterior prediction values can be used by a ranking service to rank query results. However, since posterior prediction values are based on the historical user interaction data and new items do not have historical user interaction data, then the posterior prediction values for new items can be zero. Accordingly, existing search systems can suffer from cold-start issues as described herein.

Instead of using machine learning algorithms to address cold-start issues, some existing search systems can rely on manual curation. For example, a new music album, titled "Pomegranate," is going to be released and made available on an existing search system. An existing search system can highly rank search results for the user query with the search parameter "pomegranate" with items from a drink and supplement categories (such as a pomegranate juice or a pomegranate extract supplement) based on posterior prediction values for those items. Since the "Pomegranate" album item is new, its posterior prediction value(s) will be zero and the album item would be low in the ranking of the search results. However, an administrator can set a prediction value for the new item to a number, such as the numerical value thirteen or fourteen, to manually boost the item's visibility in the search results. Another example of manual curation can include an administrator estimating the number of acquisitions for a new item. However, manual curation can be time-consuming, impractical for a large number of items, error prone, arbitrary, and/or inefficient.

In the search context, behavioral features can be useful for relevance estimation. Using behavioral features in a learning-to-rank system can be effective because of their ability to encode user behavior. However, behavioral features can take a relatively long time to learn (need many impressions to attain high values) and unlearn (until some other items receive higher values). This phenomenon can adversely affect new items because they have zero behavioral data. It takes time for new items to gather enough historical signals to gain higher positions in the ranking. For example, a newly released movie (for example, movie "X") in a popular movie series (for example, series "Y") should be ranked higher compared to old movies from the same series for a search query that includes the name of the series (for example, "Y movie"), despite the fact that the old movies would have rich historical data due to their age. In some existing systems, items, including the highly engaging ones, tend to take a fair amount of time before steadily reaching their highest ranking position. Amplitude and steepness of ranking climb vary depending on the number of impressions, acquisitions, and/or user selections received by an item.

The systems and methods described herein may improve information and/or database retrieval technology. The solutions described herein may address the technical deficiencies of learning-to-rank algorithms with respect to the cold-start issues described herein. Machine learning algorithms that apply regression models to historical data can classify new items based on similar attribute values with existing items. This approach can advantageously break the zero feedback loop of existing learning-to-rank models for new items that fail to generate user interaction data. Moreover, the technical solutions described herein can obviate the need for administrators to manually set prediction values that can be can be a time-consuming, error prone, arbitrary, and/or inefficient process. Rather, the machine learning algorithms described herein can enable new items to be efficiently and/or programmatically ranked, which did not occur in existing systems. Thus, the systems and methods described herein can improve over traditional information retrieval techniques.

As used herein, in addition to its ordinary and customary meaning, the term "item" can refer to a data object that can represent a specific thing that has a number of definable attributes. For example, an item can represent things such as, but not limited to, a physical product, a digital product, and/or an electronic document. In an information retrieval context, "item" as used herein can be synonymous with a "document." The term "item" is used interchangeably to refer to an item itself (e.g., a particular product or particular digital content) and to its description or representation in a computer system or electronic catalog. As will be apparent from the context in which it is used, the term is also sometimes used herein to refer only to the item itself or only to its representation in the computer system. Example items can be music albums, audiobooks, books, movies, television shows, and/or other media products in either an electronic format or physical format. Example items can also be electronic or digital, such as an electronic service or any electronic content provided by a buyer to a seller in which a physical good is not transferred. Users can interact with items. For example, a user can select an item in a user interface to view details about the item. A user can acquire an item. A user can also consume an item, such as by watching a movie or listening to a music album. While some aspects of the disclosure may describe an example regarding a "new item," the same disclosure may also apply to an existing item but that has minimal or no user interaction data.

Examples attributes of an item can include an author, a title, artist, brand, studio, writer, product type, director, subject, genre, and/or browse node in a hierarchy of an electronic catalog. A browse node attribute can identify an item's location in a catalog's hierarchy. For example, a media item, such as a novel, can have a browse node attribute value of "Sub-sub-category Z" and/or "Category X>Sub-category Y>Sub-sub-category Z" (for example, "Ancient" and/or "Fiction>Literature>Historical Fiction Time Periods>Ancient"). As described below, the search system can be included in an electronic catalog system with many items and categories of items.

In some embodiments, an electronic catalog system, as described herein, may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, an item image and description, customer ratings, customer and professional reviews, sales rank data, lists of related items, and/or other types of supplemental data that may assist consumers in making informed purchase or acquisition decisions. A network page can be provided that enables users to interact with items, such as selecting, acquiring, or consuming items (such as watching or playing a media content item). Users of the system may, in some embodiments, locate specific item detail pages within the electronic catalog by executing search queries, navigating a browse tree, and/or using various other navigation techniques.

As used herein, in addition to its ordinary and customary meaning, the term "posterior prediction value" can refer to an assigned likelihood of user engagement with an item and/or estimated desirability of an item after relevant evidence and/or background is taken into account. The term "posterior prediction value" can be used interchangeably with "posterior" or "posterior probability," especially in a Bayesian context. As described herein, a posterior prediction value for an item can be based on previous user interaction data with the specific item.

As used herein, in addition to its ordinary and customary meaning, the term "prior prediction value" can refer to an assigned likelihood of user engagement with an item and/or estimated desirability of an item before some evidence and/or background is taken into account or even exists for the specific item. The term "prior prediction value" can be used interchangeably with "prior" or "prior probability," especially in a Bayesian context. As described herein, a prior prediction value for an item can be based on previous user interaction data with a different item. In particular, a prior can be assigned where attributes(s) of an item with the user interaction data can correspond (such as by being the same or similar to) to attribute(s) of another item with minimal or non-existent user interaction data.

As used herein, in addition to its ordinary and customary meaning, the term "behavioral feature" can refer to a type of user engagement. Example behavioral features can include, but are not limited to, a user selection rate feature (such as a click rate), an acquisition rate feature (such as a purchase rate), a consumption rate feature, an acquisition share factor feature, or a consumption share factor, which are described in further detail below. The behavioral features can be based on historical signals that indicate previous user interactions with items, such as selection, acquisition, or consumption. The prior prediction value and/or the posterior prediction value can be for a particular behavioral feature.

Figure 1:
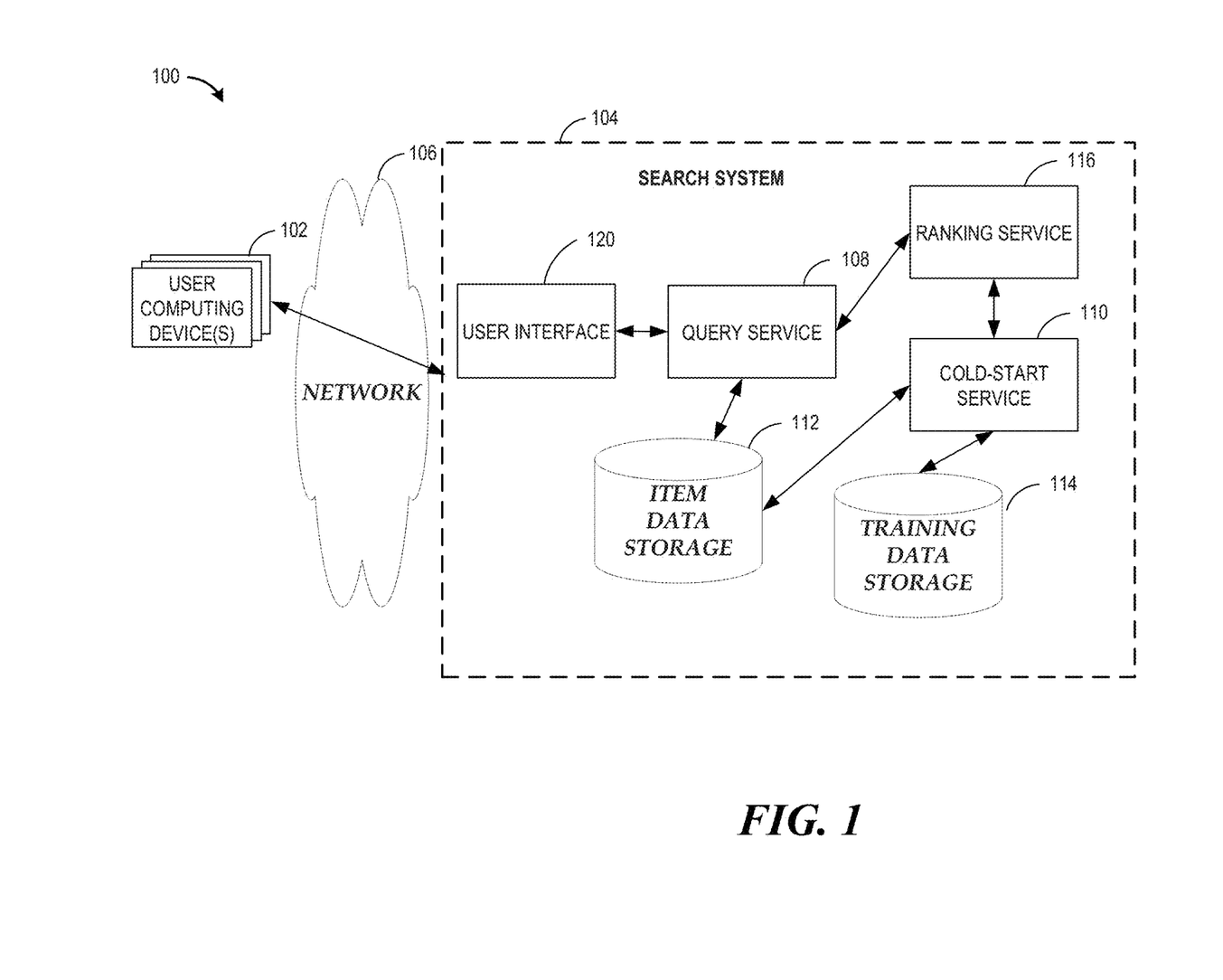
FIG. 1 is a schematic block diagram depicting an illustrative network environment for implementing a search system.

Turning to FIG. 1, an illustrative network environment 100 is shown in which a search system 104 may rank items with minimal or non-existent historical data. The network environment 100 may include one or more user computing devices 102 and the search system 104. The search system 104 may include a user interface 120, a query service 108, a cold-start service 110, a ranking service 116, an item data storage 112, and a training data storage 114. The constituents of the network environment 100 may be in communication with each other either locally or over a network 106. While certain constituents of the network environment 100 are depicted as being in communication with one another, any constituent of the network environment 100 can communicate with any other constituent of the network environment 100; however, not all of these communication lines are depicted in FIG. 1. For example, the ranking service 116 can communicate with the item data storage 112 and/or the training data storage 114.

The cold-start service 110 can train machine learning models based on historical data associated with existing items and attributes from the items. Thus, the cold-start service 110 can communicate with the item data storage 112 and/or the training data storage 114. The cold-start service 110 can process new items, which can include applying the machine learning model to the new items. The output of the machine learning models can be used as input to the ranking service 116.

Example user computing devices 102 can include a laptop or tablet computer, personal computer, personal digital assistant (PDA), hybrid PDA/mobile phone, smart wearable device (such as a smart watch), mobile phone, and/or a smartphone. A user can submit, via the user computing device 102, a search to the search system 104, such as by using the user interface 120. The query service 108 can retrieve query results from the item data storage 112. The ranking service 116 can rank the query results, which can affect the order or prominence or lack thereof, using a ranking model. The ranked query results can then be presented on the user interface 120. Users, via the user computing device 102, can further interact with items via the user interface 120 as described herein.

The item data storage 112 and/or the training data storage 114 may be embodied in hard disk drives, solid state memories, any other type of non-transitory computer-readable storage medium. The item data storage 112 and/or the training data storage 114 may also be distributed or partitioned across multiple local and/or remote storage devices. Each of the item data storage 112 and/or the training data storage 114 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The user computing devices 102 and the search system 104 may each be embodied in a plurality of devices. For example, user computing devices 102 and the search system 104 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the user computing devices 102 and the search system 104. The memory generally includes RAM, ROM, and/or other persistent and/or auxiliary non-transitory computer-readable storage media.

Additionally, in some embodiments, the search system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2:
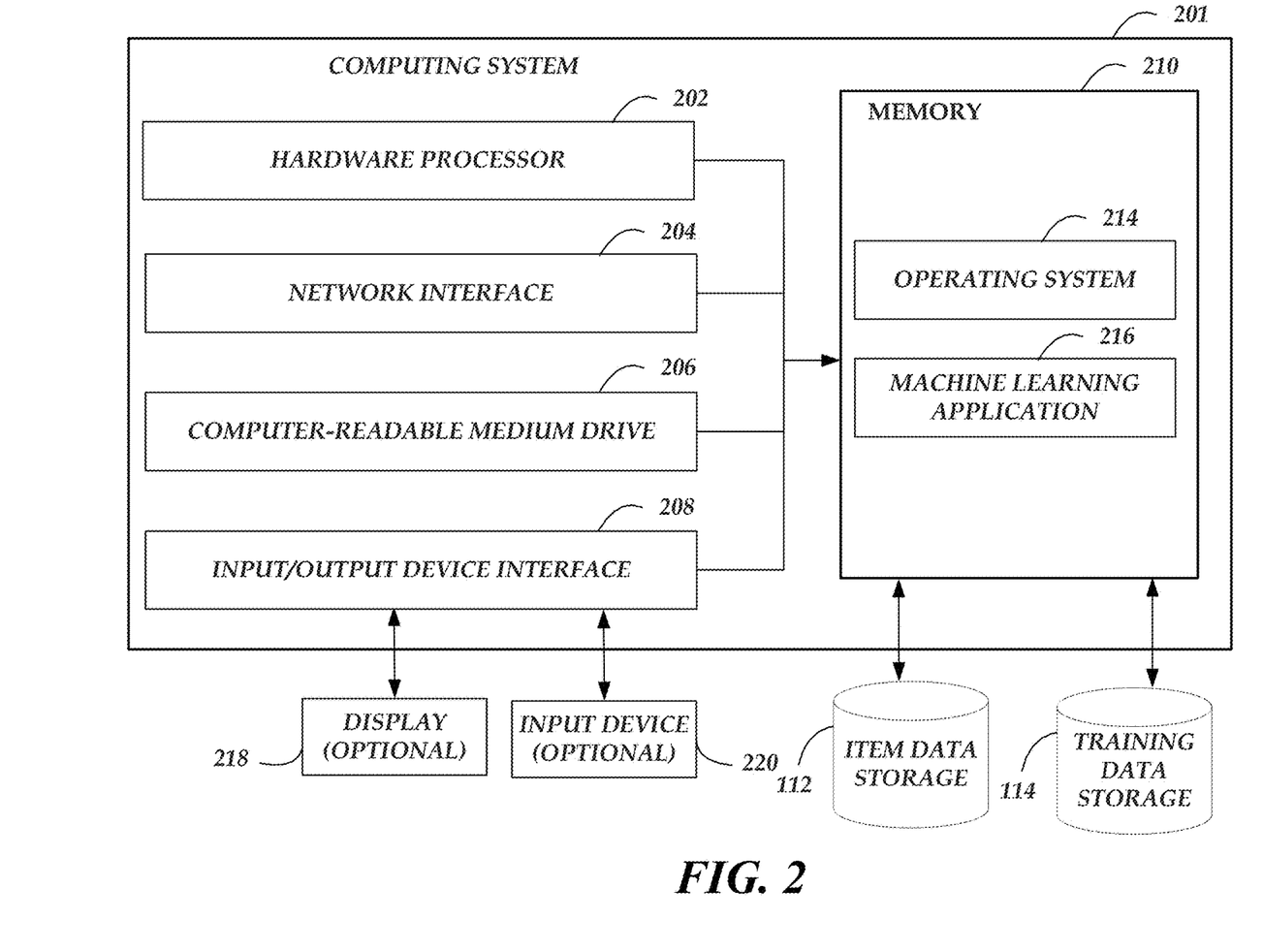
FIG. 2 is a schematic diagram depicting an illustrative general architecture of a computing system for implementing the cold-start service referenced in the network environment depicted in FIG. 1.

FIG. 2 is a schematic diagram of an illustrative general architecture of a computing system 201 for implementing the cold-start service 110 referenced in the environment 100 in FIG. 1. The computing system 201 includes an arrangement of computer hardware and software components that may be used to rapidly provision a data management service. While the general architecture of the computing system 201 is shown and described with respect to FIG. 2, the general architecture of FIG. 2 can be used to implement other services and/or devices described herein, such as the user computing device 102, the query service 108, and/or the ranking service 116. Those skilled in the art will appreciate that the computing system 201 may include more (or fewer) components than those shown in FIG. 2. Further, other computing systems described herein may include similar implementation arrangements of computer hardware and software components.

The computing system 201 for implementing the cold-start service 110 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. In other embodiments, the display 218 and input device 220 may be included in the user computing devices 102 shown in FIG. 1. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the hardware processor 202 executes in order to implement one or more embodiments of the cold-start service 110. The memory 210 generally includes RAM, ROM and/or other persistent or non-transitory computer-readable storage media. The memory 210 may store an operating system 214 that provides computer program instructions for use by the hardware processor 202 in the general administration and operation of the cold-start service 110. The memory 210 may further include other information for implementing aspects of the cold-start service 110. For example, the memory 210 may communicate with the item data storage 112 and/or the training data storage 114. In some embodiments, the item data storage 112 and/or the training data storage 114 may store one or more data structures or objects that can also be loaded into the memory 210.

The memory 210 may include a machine learning application 216 that may be executed by the hardware processor 202. In some embodiments, the machine learning application 216 may implement various aspects of the present disclosure. For example, the machine learning application 216 may train a machine learning model to generate priors using attributes from items and historical signals.

Figure 3:
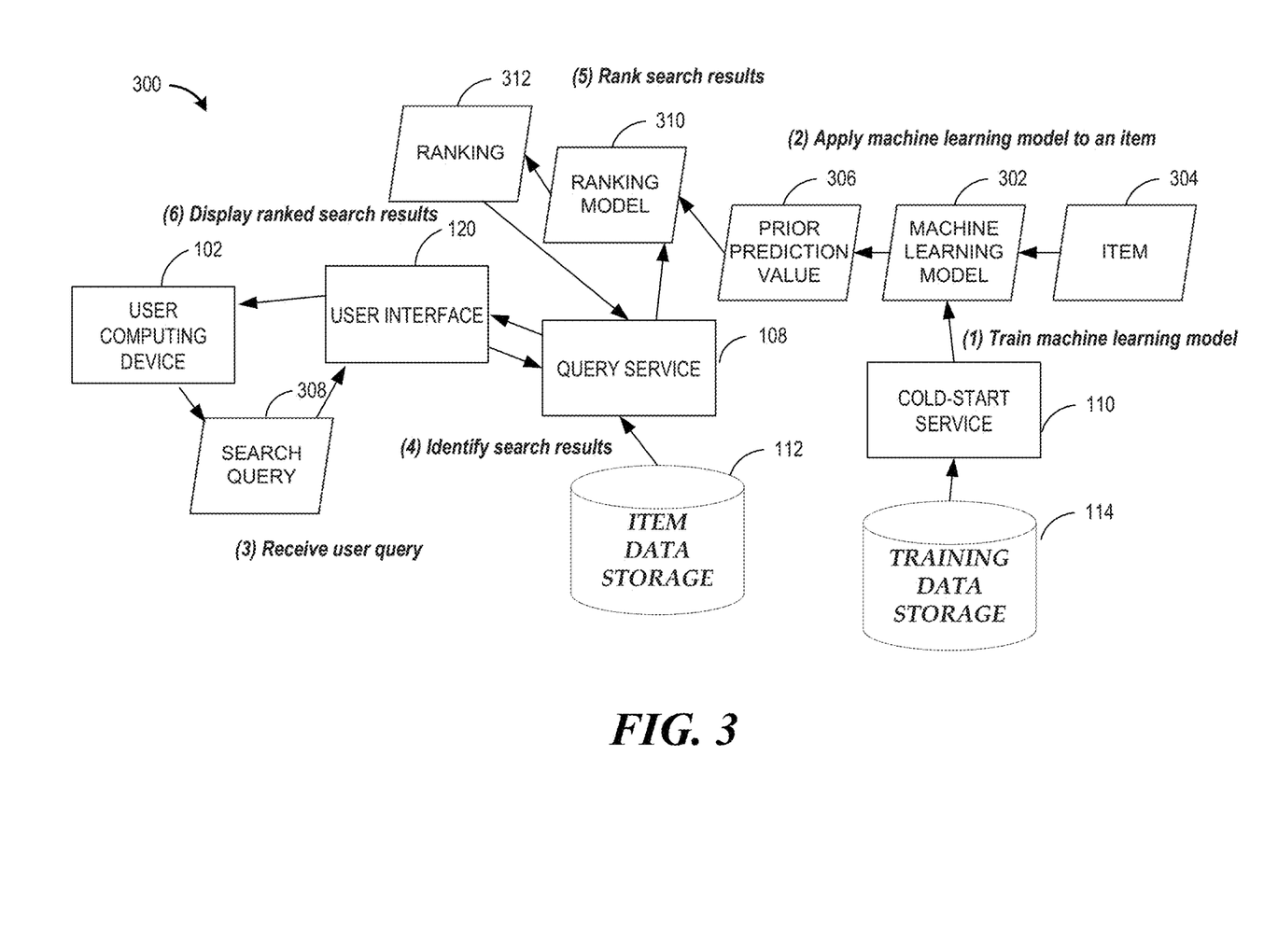
FIG. 3 is a flow diagram depicting illustrative interactions for ranking items with minimal or non-existent user interaction data.

With reference to FIG. 3, illustrative interactions are depicted for ranking items with minimal or non-existent user interaction data. The environment 300 of FIG. 3 can be similar to the environment 100 of FIG. 1. The depicted interactions in FIG. 3 are example interactions, some or all of which may be optional depending on the circumstances or embodiment. Other interactions (not illustrated) may be possible in accordance with the present disclosure in other embodiments. Similar to the communication depictions of FIG. 1, not every possible communication may be depicted in FIG. 3.

The interactions of FIG. 3 begin at step one (1) where the cold-start service 110 can train a machine learning model 302 based on training data. The machine learning model 302 can be formulated as a regression analysis. The training data can include attributes for existing items. The cold-start service 110 can generate a feature vector from attribute data for each item. The training data can further include interaction data, such as a user selection, user acquisition, or user consumption rate. Historical signals for attributes can be used to train the model, such as a historical number of selections for a particular brand received over a fixed window period, a number of times movies of an actor were consumed, or a number of acquisitions for a particular author. The cold-start service 110 feeds the historical signals to the machine learning model 302 to learn interactions between such attributes and a behavioral feature, which would serve as a prior for a new item. The regression model is then conditioned on the items' metadata.

At step two (2), after the cold-start service 110 trains the machine learning model 302, the cold-start service 110 can apply the machine learning model 302 to an item 304. The item 304 can be a new item and/or can be an item with minimal or no user interaction data. In particular, input to the machine learning model 302 can be a vector of featurized attributes for the item 304 and output of the machine learning model 302 can be the prior prediction value 306. The prior prediction value can be for a behavioral feature (such as a user selection rate). The cold-start service 110, via the machine learning model 302, can assign prior prediction values to new items that predicts user engagement with or desirability of the new items. The likelihood of user engagement and/or desirability is estimated based on historical signals on the attributes of the new item, such as brand, type, color, artist, author, etc.

At step three (3), the user interface 120 can receive a search query 308 from the user computing device 102. An example search query 308 can be a keyword search for items. At step four (4), the query service 108 can identify search results from the item data storage 112. The query service 108 can use a natural language and/or keyword search to retrieve the search results.

At step five (5), the search results can be ranked by the ranking service 116 (not illustrated). In particular, the ranking model 310 (such as a learning-to-rank model) can receive the prior prediction value 306 for a new item as input. In some embodiments, the ranking model 310 can use the prior prediction value 306 instead of a posterior prediction value (which would be zero due to the lack of interaction data for a new item, e.g., a cold start). Output of the ranking model 310 can be a ranking 312 of the search results. At step six (6), the user interface 120 can display at least some of the search results according to the ranking 312. As described herein, the search results can include new items despite the lack of interaction data due to the prior predicted values.

Figure 4:
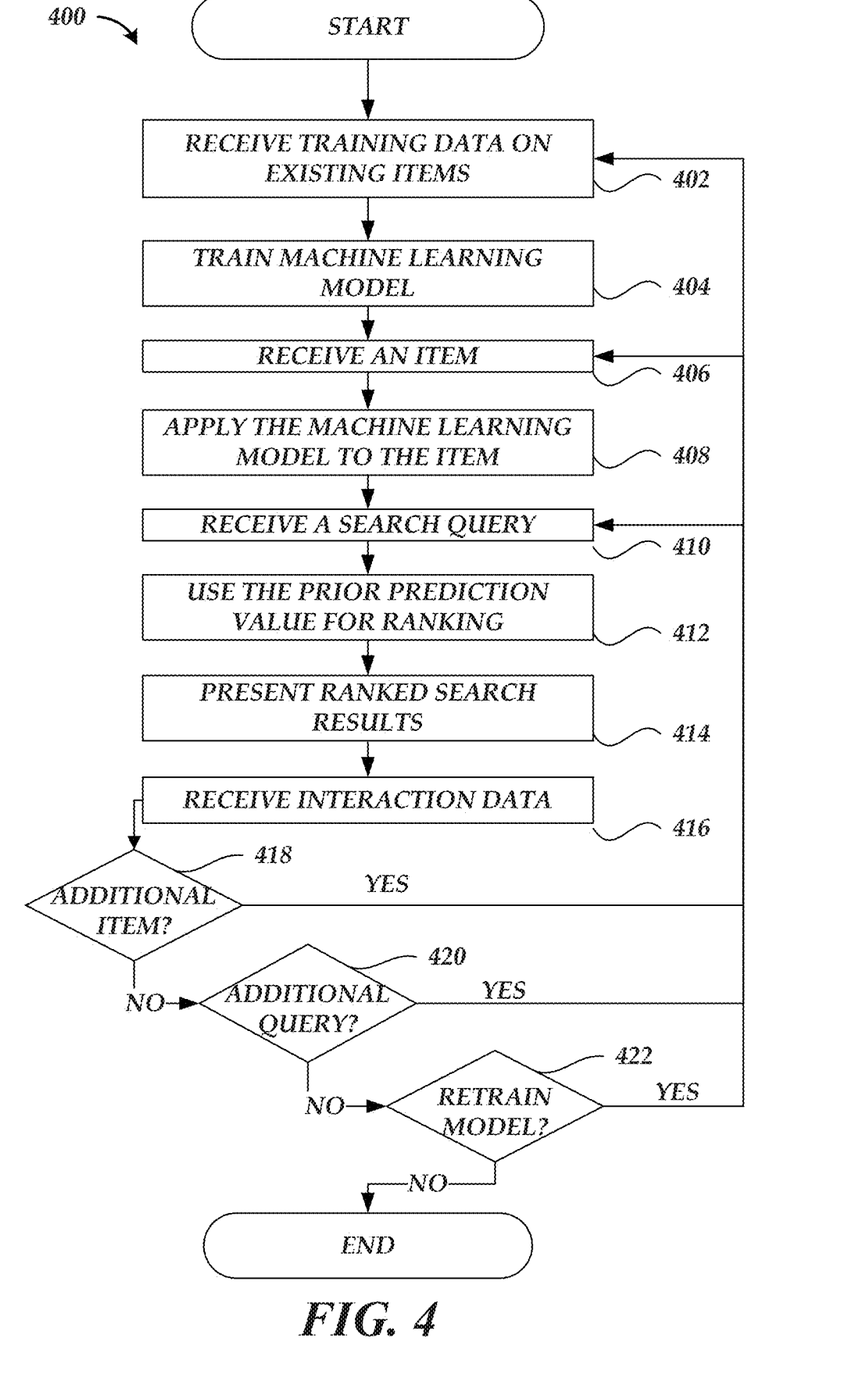
FIG. 4 is a flow chart depicting an example method for machine learned ranking of items with minimal or non-existent user interaction data.

FIG. 4 is a flow diagram depicting an example method 400 implemented by the search system 104 for machine learned ranking of items with minimal or non-existent user interaction data. As described herein, the search system 104 may include the cold-start service 110. In some embodiments, the cold-start service 110 may include the machine learning application 216, and may implement aspects of the method 400. Some aspects of the method 400 may be implemented by other components of the search system 104, such as the user interface 120, the query service 108, and/or the ranking service 116. Moreover, some aspects of the method 400 may be described above with respect to FIG. 3.

Beginning at block 402, training data on existing items can be received. In particular, the cold-start service 110 can receive the training data. In some embodiments, the cold-start service 110 can generate the training data. For example, the cold-start service 110 can receive item data. The cold-start service 110 can extract attributes from the item data and transform the attribute values into a feature vector. For a particular item, the cold-start service 110 can transform the attributes (for example, author, artist, brand, studio, writer, product type, director, subject, genre, and/or browse node) of the item into a feature vector that includes a series of numbers (for example, [$a_1$, $a_2$, $a_3$, $a_4$, etc.]). A feature vector can be a numerical representation of the attribute value. The attribute value can be a textual string. There can be a one-to-one correspondence between a numerical representation of an attribute value and the attribute value itself. For example, "Jane Barron" can be assigned a numerical value of 1 in a feature vector and "John Morris" can be assigned a numerical value of 12 in a different feature vector. Thus, the training data can include attributes in a feature vector format. The training data can further include user interaction data, such as historical signals indicating prior user interactions with an existing item. Example historical signals can include a number of selections (e.g., clicks) for a particular brand received during a time period, a number of times movies of particular actor were consumed, or number of acquisitions of content by a particular author. Additional historical signals can indicate selections (e.g., clicks), acquisitions, or views of an item.

In some embodiments, the cold-start service 110 can use normalization logic to transform the attributes (for example, author, title, artist, brand, studio, writer, product type, director, subject, genre, and/or browse node) of the item into a feature vector. For example, the machine learning application 216 can convert textual attribute values to lowercase to account for variations in uppercase or lowercase spelling of common attributes. As another example, textual values for attributes that are names of persons, such as author, artist, writer, or director, can be in a variety of different formats. For example, the name of a person can be "<last name>, <first name>" or a "<first name> <last name>" format. Thus, the machine learning application 216, can be convert name string values into a standard format (such as a "<first name> <last name>" format). Accordingly, the feature vectors for items can have the same values for common attribute values despite minor variations in the attribute values to account for variations in spelling or casing.

In some embodiments, a training data set can be for a particular geographic region. Accordingly, in a training data set for a particular geographic region, the historical signals can be based on user interactions from the particular geographic region. For example, artist "A" may be popular in the United States but not in Europe; conversely, artist "B" may be popular in Europe but not in the United States. Thus, a historical signal for artist "A" may have a high selection, acquisition, or engagement value based on data from the United States, but the same historical signal may have a low value based on European data. Conversely, a historical signal for artist "B" may have a high selection, acquisition, or engagement value based on European data, but the same historical signal may have a low value based on data from the United States. Thus, prior prediction values that are specific to a geographic region can be generated based on training data for that region. A machine learning model can be generated based on the geographic-specific training data.

At block 404, the machine learning model can be trained. In particular, the cold-start service 110 can train the machine learning model with the training data. In the model, the likelihood of user engagement with an item and/or desirability of an item can be estimated based on the historical signals associated with attributes (such as brand, type, color, artist, author, etc.) from existing items. For example, historical signals can include a number of selections (e.g., clicks) for a particular brand received during a time period, a number of times movies of particular actor were consumed, or number of acquisitions of content by a particular author. The signals are fed to the machine learning model to learn interactions between attribute(s) and a behavioral feature, which would serve as a prior for a new item. The machine learning model can include a user engagement feature, such as a user selection rate feature, an acquisition rate feature, or a consumption rate feature.

In some embodiments, the machine learning model can be or include a regression model conditioned on item metadata (such as the attributes and/or historical signals) as shown in the below equation.

$$P_j^i = f(x_i)$$

$P_j^i$ can be a prior prediction value for behavioral feature j (e.g., user selection rate) for item i, and $x_i$ can be a vector of featurized attributes of item i.

The machine learning model can be trained on behavioral features such as user engagement features. The behavioral features can represent some form of user engagement. Value(s) for the behavioral feature(s) for a particular item can be priors (an estimate based on other items historical data) or can be posteriors (based on the particular item's history). The following are example behavioral features that can be included in the machine learning model. Moreover, each of the following example features can be calculated based on a period of time, selections or acquisitions over the last thirty days or single day, etc. A user selection rate feature can indicate a ratio of user selections for a particular item to a total number of views for the particular item, which can also be known or referred to as impressions. For example, the user selection rate can indicate the rate at which a user "clicks" on a search result for an item versus the number of times that search result is presented to a user. An acquisition rate feature can indicate a ratio of user acquisitions of a particular item to a total number of views for the particular item (e.g., impressions). A consumption rate feature can indicate a ratio of consumptions of a particular item to a total number of consumptions of an item. An acquisition share factor feature can indicate a ratio of users that acquired a particular item to a number of total users that made an acquisition. A consumption share factor can indicate a ratio of users that consumed a particular item to a total number of users that consumed an item.

In some embodiments, the machine learning model can be or include an ensemble model, such as a gradient boosted decision tree model or a random forest model. The cold-start service 110 and/or the machine learning application 216 can begin by training a decision tree in which each observation is assigned an equal weight. After evaluating the first tree, the application 216 can increase the weights of those observations that are difficult to classify and lower the weights for those that are easy to classify. The application 216 can generate a second tree from the weighted data. The new model can be a combination of the first tree and the second tree. The application 216 can compute the classification error from the two-tree ensemble model and grow a third tree to predict the revised residuals. The application 216 can repeat this process for a number of iterations. Subsequent trees are capable of classifying observations that are not well classified by the previous trees. Predictions of the final ensemble model can therefore be the weighted sum of the predictions made by the previous tree models. Gradient boosting can train many models in a gradual, additive, and/or sequential manner. In gradient boosting, the application 216 can identify the shortcomings of weak learners (e.g., decision trees) by using gradients in a loss function. A loss function can be a measure indicating how well a model's coefficients are at fitting the underlying data. Since the purpose of the model can be to predict user engagement and/or desirability by using a regression, then the loss function can be based off the error between true and predicted behavioral features (such as user selection, user acquisition, and/or user consumption).

The application 216 can tune hyperparameters (which can be referred to as model parameters) using Bayesian optimization. A hyperparameter or model hyperparameter can be a configuration that is external to the model and whose value cannot be estimated from data. In some embodiments, the application 216 can use a maximum tree depth of approximately 8, a minimum sum of instance weight needed in a child as approximately 1, a minimum loss reduction to make a leaf partition as approximately 2, a ratio of the training instances as approximately 1, a number of sample columns when constructing each tree as approximately 3.2, a L1 regularization penalty term of approximately 5.5, a L2 regularization penalty term of approximately 5.5, a learning rate of approximately 0.05, and/or a number of boosting rounds of approximately 400. For example, the model parameters for a gradient boosted decision tree model can include: (i) a tree depth is between approximately 7 and approximately 9, (ii) a L1 regularization penalty term is between approximately 5 and approximately 6, (iii) a L2 regularization penalty term is between approximately 5 and approximately 6, (iv) a learning rate is between approximately 0.04 and approximately 0.06, and/or (v) a number of boosting rounds is between approximately 300 and approximately 500. Additional example model parameters for a gradient boosted decision tree model can include: (i) a minimum sum of instance weight needed in a child is between approximately 1 and approximately 2, (ii) a minimum loss reduction to make a leaf partition is between approximately 1 and approximately 2, and/or (iii) a ratio of the training instances is between approximately 1 and approximately 2.

At block 406, an item can be received. In particular, the cold-start service 110 can receive an item to generate a prior prediction value. The item can be a new item. The item can be an item with minimal or no user interaction data. For example, even if an item has been in the search system 104 for a period of time, the cold-start service 110 can generate a prior prediction value for the existing item since it has minimal or no user interaction data. The item can be excluded from the training data and/or can lack user interaction data. However, as described herein, an item to be processed (such as a new item) can have the same or similar attribute values as an existing item. Unlike the received item that has little or no interaction data, an existing item can have interaction data. Moreover, the method 400 can be applied to any item in an electronic catalog, such as all of the items in the catalog. Thus, while aspects of the present disclosure discuss generating priors for new items, priors can be generated for any and all items in an electronic catalog, including older items.

Applying the techniques described herein to older items can have advantages. For example, there can be some items, such as a family of items, where there is presentation bias in an existing search system. Through the use of prior prediction values, the older items can be presented higher in a ranking that can allow users to discover the item. This can address an issue where older items never received any impressions because they were never discovered.

At block 408, the machine learning model can be applied to the item. In particular, the cold-start service 110 can apply the machine learning model to the item. As described herein, the item can be a new item and/or can have minimal or no user interaction data. Input to the machine learning model can include a feature vector of the attributes for the item. Output of the machine learning model can include a prior prediction value for the item. One or more prior prediction values for a behavioral feature can be generated for an item, such as a user selection rate feature (e.g., a click rate), an acquisition rate feature (e.g., a purchase rate), or a consumption rate. The machine learning model can generate the prior prediction value based at least in part on (i) a correspondence between a respective attribute value of the input item and an existing item and (ii) the historical signal for the existing item. For example, if an artist's last album (an existing item) sold really well, then a new album (a new item) may receive a relatively high prior prediction value because the new album and the existing album share the same artist according to the machine learning model. In particular, if a first feature vector for a first item has a first value that matches a second value of a second feature vector for a second item, the machine learning model can determine that there is some correspondence between the first item and the second item. The prior prediction value can be an estimate of the likelihood of user engagement with the item.

At block 410, a search query can be received. In particular, the user interface 120 can receive a search query. The search query can include one or more search terms. In an electronic catalog context, a user can search for an item to view, acquire, or consume, such as a music album or a movie. For example, a user can submit the name of an artist or an author in the user interface 120 to search for items. In some embodiments, the query service 108 can identify or receive search results based at least in part on the search query, which can include a new item or an item with minimal or no user interaction data. For example, the query service 108 can use a natural language and/or keyword search to retrieve the search results.

At block 412, the prior prediction value can be used for ranking. In particular, the ranking service 116 can use the prior prediction value for ranking. The ranking service 116 can apply a ranking model to search results. Input to the ranking model can include a prior prediction value for the item. Output of the ranking model can indicate a rank for the item relative to another item included in the search results. Depending on the embodiment, the ranking model can use a prior prediction value, a posterior prediction value, a prior prediction value or a posterior prediction value interchangeably, and/or a combination of both prior and posterior values for each item. Thus, the ranking service 116 can rank new and existing items against one another.

In a learning-to-rank framework, values for behavioral features along with lexical and/or semantic features can be used to measure relevance (r) between query (q) and item (i) as $P(r|q, i)$. For new items and/or items with no user interaction data, the posterior values for behavioral features are zero. Similarly, for items with minimal user interaction data, posterior values for behavioral features may be relatively low. Therefore, the ranking service 116 can use prior prediction values instead of or in addition to posterior prediction values to potentially boost the rank of certain items that would be ranked lower without the prior prediction values. As described herein, in some embodiments, as some items receive historical signals over time, the importance of using priors for ranking can shift relative to the importance of using posteriors for ranking.

At block 414, ranked search results can be presented. In particular, the user interface 120 can present at least some of the search results in a ranked order. The user interface 120 can present at least some of the search results and the item (which can be a new item or an item with minimal or no user interaction data) based at least in part on the rank. For a new item that did not have any user interaction data, the prior prediction value for a type of user engagement can indicate that a new item may be desired highly relative to other items. This can be reflected in the rank. Thus, presentation of the item can be shown in a manner (such as by being presented before other items) that indicates the determined ranking of the item relative to other items in the search results. For example, a rank for a first item can be the numerical value one, a rank for a second item can be the numerical value ten, and thus the rank for the first item can indicate that the first item should be given a higher relevance in the search results relative to the second item. An example ranking can be a list of ranks, where each rank in the list indicates a position for an item relative to the other items in the ranking.

At block 416, interaction data can be received. In particular, the user interface 120 can receive user interactions. For example, via the user interface 120, a user can select, acquire, or consume a particular item. Data representing these captured interactions can be stored and used for training. The interaction data can be for new or existing items. As described herein, the interaction data can be used to retrain a machine learning model and/or to generate updated priors.

At block 418, it can be determined whether there is an additional item to be processed. For example, if new items are being added to the electronic catalog, the method 400 can return to block 406 to process the new item and generate a prior for the new item. However, if there are not new items to be processed, the method 400 can proceed to block 420. At block 420, it can be determined whether there is an additional query to be processed. The user interface 120 can receive additional queries that can be forwarded to the query service 108 for processing. For example, a single user can submit multiple queries to the search system 104 and/or multiple users can submit queries to the search system 104. If additional queries are received for processing, the method 400 can return to block 410 to process the query to return and present ranked search results.

At block 422, it can be determined whether the machine learning model should be retrained. In particular, the machine learning application 216 can retrain the machine learning model. For example, the machine learning application 216 can determine to retrain the machine learning model on a periodic basis (such as once a day), an aperiodic basis, and/or on-demand. As shown, the method 400 can return to block 402. Thus, the models described herein can take into account that user engagement with items changes over time (such as by either going up or down as the popularity of an item changes over time). For example, historical signals, priors, and/or posteriors can be recalculated based on some frequency, such as once a day. Thus, the machine learning models described herein can be recalculated based on new items and/or updated historical signals, priors, and/or posteriors, on a periodic basis, an aperiodic basis, or on-demand.

Figure 5:
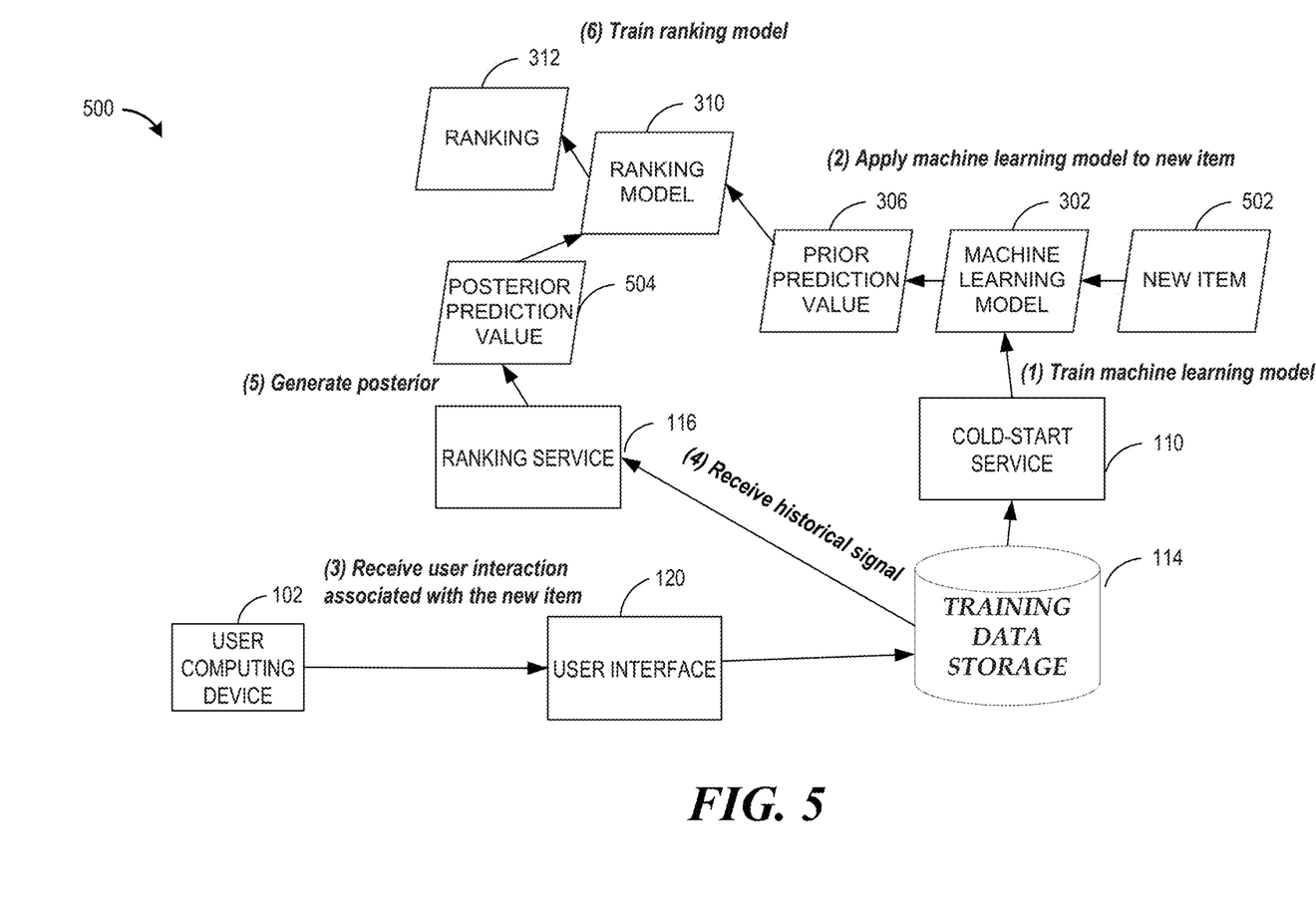
FIG. 5 is a flow diagram depicting illustrative interactions related to training a ranking model.

With reference to FIG. 5, illustrative interactions are depicted related to training a ranking model. The environment 500 of FIG. 5 can be similar to the environments 100, 300 of FIGS. 1 and 3, respectively. The depicted interactions in FIG. 5 are example interactions, some or all of which may be optional depending on the circumstances or embodiment. Other interactions (not illustrated) may be possible in accordance with the present disclosure in other embodiments. Similar to the communication depictions of FIG. 1, not every possible communication may be depicted in FIG. 5. Moreover, the interactions described below with respect to FIG. 5 may be similar to and/or occur in conjunction with the interactions described above with respect to FIG. 3.

The interactions of FIG. 5 begin at step one (1) where the cold-start service 110 can train a machine learning model 302 based on training data. Step one (1) of FIG. 5 can be similar to step one (1) of FIG. 3. At step two (2), after the cold-start service 110 trained the machine learning model 302, the cold-start service 110 can apply the machine learning model 302 to a new item 502 that does not have any user interaction data. Step two (2) of FIG. 5 can be similar to step two (2) of FIG. 3. As described herein, application of the machine learning model 302 to the new item 502 can output the prior prediction value 306.

At step three (3), the user interface 120 can receive a user interaction associated with the new item 502. The user interaction can be a selection, acquisition, or a consumption of the new item 502 by a user. User interaction data associated with the user interaction can be stored in the training data storage 114, which can be used for training purposes. At step (4), the ranking service 116 can receive a historical signal for the new item 502. The historical signal can indicate a user interaction with the new item 502.

At step five (5), the ranking service 116 can generate a posterior prediction value 504 for the new item 502. The posterior prediction value 504 can quantify user interactions with the new item 502, such as impressions, acquisitions, or selections, which can be referred to as behavioral features. At step six (6), the ranking service 116 can train the ranking model 310 using the prior prediction value 306 and the posterior prediction value 504. Instead of using the posterior prediction value 504 in place of the prior prediction value 306 in the ranking model 310, the ranking service 116 can train the ranking model 310 to provide more weight to at least one of the posterior prediction value 504 or the prior prediction value 306 in determining the ranking. In some embodiments, the ranking service 116 can train the ranking model 310 to select one of the posterior prediction value 504 or the prior prediction value 306 based on the input to the ranking model 310.

Figure 6:
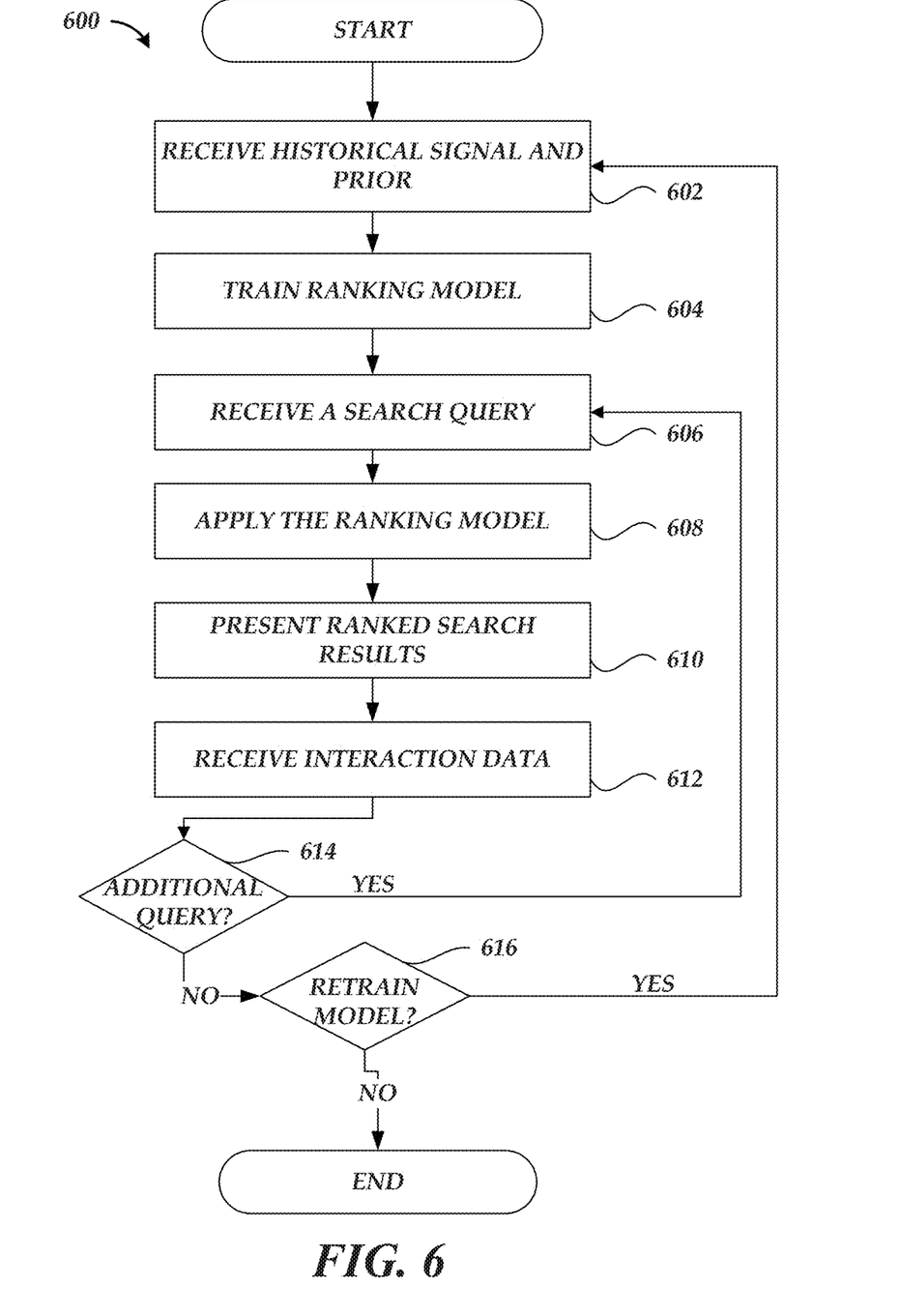
FIG. 6 is a flow chart depicting an example method for training and/or using a ranking model.

FIG. 6 is a flow diagram depicting an example method 600 implemented by the search system 104 for training and/or using a ranking model. Aspects of the method 600 may be implemented by components of the search system 104, such as the user interface 120, the query service 108, and/or the ranking service 116. Moreover, some aspects of the method 600 may be described above with respect to FIG. 5. Blocks of the method 600 of FIG. 6 may be similar to the blocks of the method 400 of FIG. 4. Blocks of the method 600 of FIG. 6 may execute in conjunction with the blocks of the method 400 of FIG. 4.

Beginning a block 602, a historical signal and a prior can be received. In particular, the ranking service 116 can receive a historical signal from the training data storage 114. For example, a new item can be added to the search system 104 at a first time. A user can interact with the new item, which can be recorded by the search system 104. For example, a user can select, acquire, or consume the new item. The search system 104 can generate a historical signal that indicates the prior user interaction with the new item at a second time. The ranking service 116 can also receive priors from the cold-start service 110. Details regarding generating priors are described in further detail above with respect to the method 400 of FIG. 4. The ranking service 116 can generate posteriors from historical signals and/or interaction data, as described herein.

At block 604, a ranking model can be trained. In particular, the ranking service 116 can train the ranking model. In some embodiments, the ranking service 116 can generate an updated ranking model using at least the historical signal for the new item and a prior prediction value for the new item. The updated ranking model can be configured to provide more weight to the historical signal or the prior prediction value during application. For example, the ranking service 116 can generate a posterior prediction value from the historical signal. The updated ranking model can be configured to provide more weight to the posterior prediction value or the prior prediction value during application based on how the model was trained.

At block 606, another search query can be received. In particular, the user interface 120 can receive the search query. The block 606 of FIG. 6 for receiving a search query can be similar to block 410 of FIG. 4 for receiving a search query. The query service 108 can identify search results based at least in part on the search query, which can include the new item. Moreover, the subsequent search query can be receive after some user interaction data for the new item has been received.

At block 608, the ranking model can be applied. In particular, the ranking service 116 can apply the ranking model to items from the search results. Output of the ranking model can indicate a ranking of the search results. The block 608 of FIG. 6 for applying a ranking model can be similar to block 412 of FIG. 4 for applying a ranking model. In some embodiments, applying the ranking model can include using a combination of the prior prediction value and the post prediction value as trained.

In other embodiments, the ranking model can determine whether to use the posterior prediction value instead of the prior prediction value, or vice versa. For example, the ranking service 116 can determine that a period of time has elapsed (for example, three days) after the item was added to a database, then the ranking service 116 can use the posterior prediction value instead of the prior prediction value in the ranking model. Conversely, if the period of time has not elapsed, then the ranking service can use the prior prediction value instead of the posterior prediction value. Thus, with either the posterior or prior prediction value as input, output of the ranking model can indicate a ranking of the search results that includes the new item. The ranking model can be agnostic as to the source of the behavioral feature value, either prior or posterior.

At block 610, at least some of the search results can be presented based on the ranking. In particular, the user interface 120 can present at least some of the search results including the item at least in part on the ranking. The block 610 of FIG. 6 for presenting search results can be similar to block 414 of FIG. 4 for presenting search results.

At block 612, interaction data can be received. In particular, the user interface 120 can receive user interactions. For example, via the user interface 120, a user can select, acquire, or consume a particular item. Data representing these captured interactions can be stored and used for training. The interaction data can be for new or existing items. As described herein, the interaction data can be used generate updated historical signals, priors, and/or posteriors. Moreover, the interaction data can be used retrain the ranking model as described below.

At block 614, it can be determined whether there is an additional query to be processed. The user interface 120 can receive additional queries that can be forwarded to the query service 108 for processing. If additional queries are received for processing, the method 600 can return to block 606 to process the query to return and present ranked search results. At block 616, it can be determined whether the ranking model should be retrained. In particular, the ranking service 116 can retrain the ranking model. For example, the ranking service 116 can determine to retrain the ranking model on a periodic basis (such as once a day), an aperiodic basis, and/or on-demand. If the ranking model should be retrained, the method 600 can return to block 602 to process the historical signals and priors.

While many embodiments discuss herein use media items as an example, it will be appreciated that the systems and methods described herein for addressing cold-start issues in a search system can be applied to any other type of item. The machine learning techniques described herein can be applied to non-media items where there is metadata for the non-media items, such as attributes and/or historical data.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
under control of a computer hardware processor configured with specific computer executable instructions,
generating training data comprising (i) a plurality of attributes for a first item in a first feature vector, and (ii) a first historical signal indicating a first prior user interaction with the first item;
training a machine learning model using the training data;
receiving a second item different from the first item, wherein the second item is excluded from the training data, and wherein the second item lacks user interaction data at a first time;
applying the machine learning model to the second item, wherein input to the machine learning model comprises a second feature vector of the plurality of attributes for the second item, wherein output of the machine learning model comprises a prior prediction value for the second item, and wherein the prior prediction value is based at least in part on (i) a correspondence between a respective attribute value of the second item and the first item, and (ii) the first historical signal;
generating a ranking model using at least the prior prediction value;
receiving a second historical signal indicating a second prior user interaction with the second item at a second time;
generating an updated ranking model using at least the second historical signal and the prior prediction value, wherein the updated ranking model is configured to provide more weight to at least one of the second historical signal or the prior prediction value during application of the updated ranking model;
receiving a first search query;
identifying a plurality of search results based at least in part on the first search query, wherein the plurality of search results includes the second item;
applying the updated ranking model to the plurality of search results, wherein output of the ranking model indicates a rank for the second item relative to another item included in the plurality of search results; and
causing presentation of at least some of the plurality of search results and the second item based at least in part on the rank.

2. The computer-implemented method of claim 1, further comprising:
receiving a third historical signal indicating a third prior user interaction with the second item at a third time;
generating a posterior prediction value for the second item based at least in part on the third historical signal;
receiving a second search query;
in response to receiving the second search query, applying a second ranking model to a plurality of additional search results, wherein applying the second ranking model further comprises:
determining to use the posterior prediction value instead of the prior prediction value; and
providing the posterior prediction value to the second ranking model as input, wherein output of the second ranking model indicates a second ranking of the plurality of additional search results comprising the second item; and
causing presentation of at least some of the plurality of additional search results based at least in part on the second ranking.

3. The computer-implemented method of claim 2, wherein determining to use the posterior prediction value instead of the prior prediction value further comprises:
determining that a period of time has elapsed after the second item was added to a database.

4. The computer-implemented method of claim 1, wherein the machine learning model comprises a user engagement feature.

5. The computer-implemented method of claim 1, wherein the prior prediction value is an estimate of a likelihood of user engagement with the second item.

6. A system comprising:
a data storage medium; and
one or more computer hardware processors in communication with the data storage medium, wherein the one or more computer hardware processors are configured to execute computer-executable instructions to at least:
receive training data comprising (i) a plurality of attributes for a first item in a first feature vector, and (ii)

a first historical signal indicating a first prior user interaction with the first item;

train a machine learning model using the training data;

receive a second item different from the first item, wherein the second item is excluded from the training data;

apply the machine learning model to the second item, wherein input to the machine learning model comprises a second feature vector of the plurality of attributes for the second item, wherein output of the machine learning model comprises a prior prediction value for the second item, and wherein the prior prediction value is based at least in part on (i) a correspondence between a respective attribute value of the second item and the first item, and (ii) the first historical signal;

generate a ranking model using at least the prior prediction value;

receive a second historical signal indicating a second prior user interaction with the second item;

generate an updated ranking model using at least the second historical signal and the prior prediction value, wherein the updated ranking model is configured to provide more weight to at least one of the second historical signal or the prior prediction value during application of the updated ranking model;

receive a first search query;

identify a plurality of search results based at least in part on the first search query, wherein the plurality of search results includes the second item;

apply the updated ranking model to the plurality of search results, wherein output of the ranking model indicates a rank for the second item relative to another item included in the plurality of search results; and cause presentation of at least some of the plurality of search results and the second item based at least in part on the rank.

7. The system of claim 6, wherein an attribute of the plurality of attributes comprises at least one of an author, a title, an artist, a brand, a studio, a writer, a product type, a director, a subject, a genre, or a browse node.

8. The system of claim 6, wherein the machine learning model comprises a user selection rate feature that indicates a ratio of user selections for a particular item to a total number of views for the particular item.

9. The system of claim 6, wherein the machine learning model comprises an acquisition rate feature that indicates a ratio of user acquisitions of a particular item to a total number of views for the particular item.

10. The system of claim 6, wherein the machine learning model comprises a consumption rate feature that indicates a ratio of consumptions a particular item to a total number of consumptions of an item.

11. The system of claim 6, wherein the machine learning model comprises an acquisition share factor feature that indicates a ratio of users that acquired a particular item to a number of total users that made an acquisition.

12. The system of claim 6, wherein the machine learning model comprises a consumption share factor feature that indicates a ratio of users that consumed a particular item to a number of total users that consumed an item.

13. A system comprising:

a data storage medium; and one or more computer hardware processors in communication with the data storage medium, wherein the one or more computer hardware processors are configured to execute computer-executable instructions to at least:

receive a first item different from a second item, wherein the first item comprises a plurality of attributes, wherein the second item comprises the plurality of attributes, and wherein the first item lacks user interaction data at a first time and user interaction data exists for the second item;

apply a machine learning model to the first item, wherein input to the machine learning model comprises a first feature vector of the plurality of attributes for the first item, wherein output of the machine learning model comprises a prior prediction value for the first item, and wherein the prior prediction value is based at least in part on (i) a correspondence between a respective attribute value of the first item and the second item, and (ii) the user interaction data for the second item;

generate a ranking model using at least the prior prediction value;

receive a historical signal indicating a user interaction with the first item at a second time;

generate a posterior prediction value for the first item based at least in part on the historical signal; and generate an updated ranking model using at least the prior prediction value and the posterior prediction value, wherein the updated ranking model is configured to select at least one of the prior prediction value or the posterior prediction value during application of the updated ranking model;

receive a first search query;

receive a plurality of search results based at least in part on the first search query, wherein the plurality of search results includes the first item;

apply the updated ranking model to the plurality of search results, wherein output of the ranking model indicates a rank for the first item relative to another item from the plurality of search results; and cause presentation of at least some of the plurality of search results and the first item based at least in part on the rank.

14. The system of claim 13, wherein the one or more computer hardware processors are configured to execute further computer-executable instructions to at least:

receive training data comprising (i) a plurality of attributes for the second item in the first feature vector, and (ii) the user interaction data for the second item; and train the machine learning model using the training data.

15. The system of claim 13, wherein the one or more computer hardware processors are configured to execute further computer-executable instructions to at least:

receive a second historical signal indicating a second user interaction with the first item at a third time;

generate a second posterior prediction value for the first item based at least in part on the second historical signal; and receive a second search query;

receive a plurality of additional search results based at least in part on the second search query, wherein the plurality of additional search results includes the first item;

apply a second ranking model to the plurality of additional search results, wherein output of the updated ranking model indicates a second ranking of the plurality of additional search results, and wherein to apply the second ranking model, the one or more computer hardware processors are configured to execute the further computer-executable instructions to at least:
    determine to use the second posterior prediction value instead of the prior prediction value; and
    provide the second posterior prediction value to the second ranking model as input, wherein output of the second ranking model indicates a second ranking of the plurality of additional search results comprising the second item; and
cause presentation of at least some of the plurality of additional search results based at least in part on the second ranking.

16. The system of claim 13, wherein the machine learning model comprises an ensemble model.

17. The system of claim 16, wherein the ensemble model comprises a gradient boosted decision tree model.

18. The system of claim 17, wherein a plurality of model parameters for the gradient boosted decision tree model comprises:
    (i) a tree depth is between approximately 7 and approximately 9,
    (ii) a L1 regularization penalty term is between approximately 5 and approximately 6,
    (iii) a L2 regularization penalty term is between approximately 5 and approximately 6,
    (iv) a learning rate is between approximately 0.04 and approximately 0.06, and
    (v) a number of boosting rounds is between approximately 300 and approximately 500.

19. The system of claim 17, wherein a plurality of model parameters for the gradient boosted decision tree model comprises:
    (i) a minimum sum of instance weight needed in a child is between approximately 1 and approximately 2,
    (ii) a minimum loss reduction to make a leaf partition is between approximately 1 and approximately 2, and
    (iii) a ratio of training instances is between approximately 1 and approximately 2.

20. The system of claim 13, wherein the machine learning model comprises a user selection rate feature that indicates a ratio of user selections for a particular item to a total number of views for the particular item.

* * * * *